UNITED STATES PATENT OFFICE.

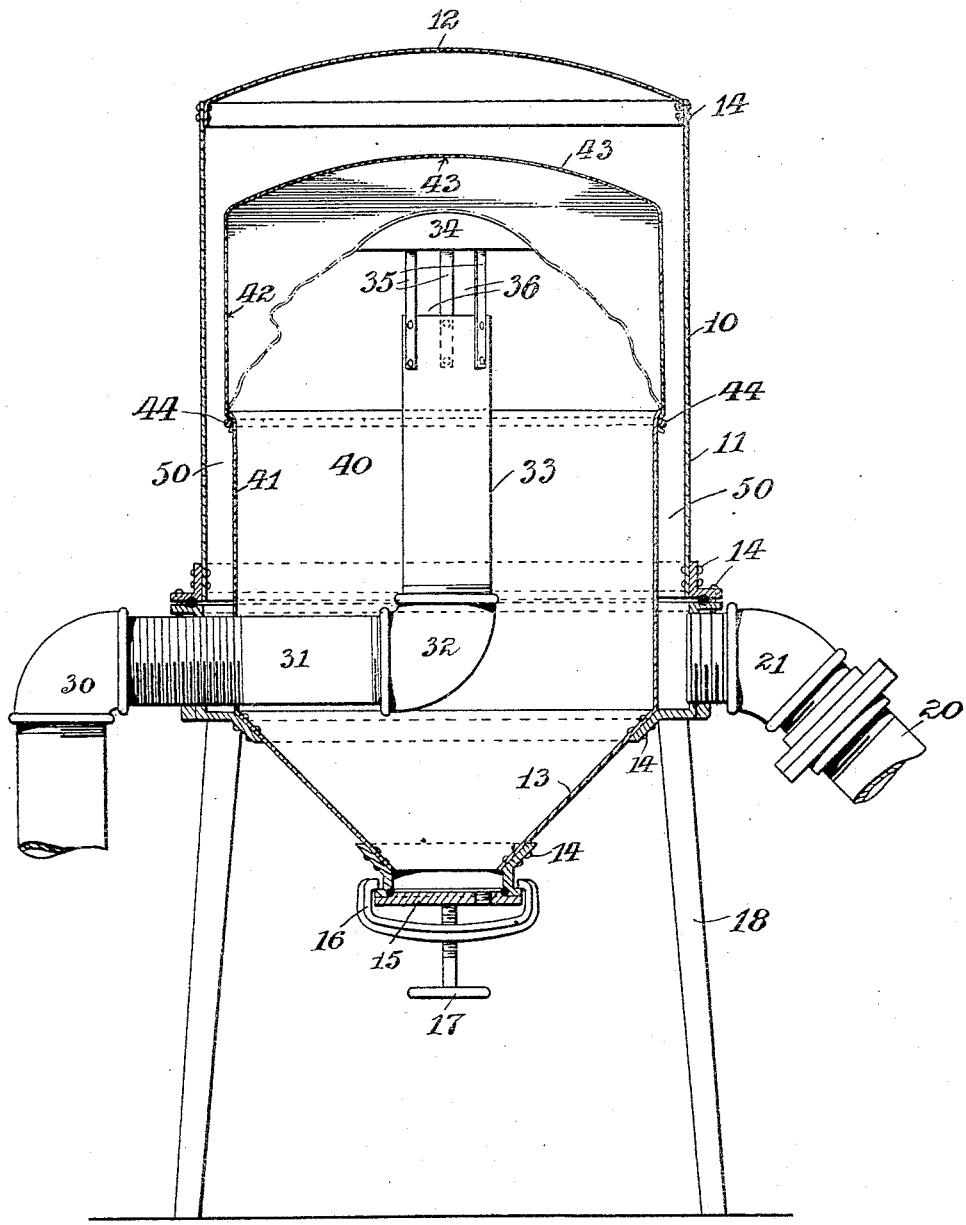

RALPH F. DISERENS, OF BRADFORD, PENNSYLVANIA, ASSIGNOR TO THE BLAISDELL MACHINERY COMPANY, OF BRADFORD, PENNSYLVANIA, A CORPORATION OF PENNSYLVANIA.

DRY SEPARATOR FOR DUST-REMOVING APPARATUS.

932,686.      Specification of Letters Patent.      Patented Aug. 31, 1909.

Application filed May 14, 1907. Serial No. 373,547.

*To all whom it may concern:*

Be it known that I, RALPH F. DISERENS, a citizen of the United States, residing at Bradford, in the county of McKean and State of Pennsylvania, have invented certain new and useful Improvements in Dry Separators for Dust-Removing Apparatus, of which the following is a specification.

My invention relates to dust removing apparatus and more particularly to that kind of apparatus comprising a nozzle having a dust collecting inlet slot and means, as a suction pump, for creating a partial vacuum back of the inlet of the nozzle for the purpose of removing the dust laden air from the surface over which the nozzle is moved. In such an apparatus it is convenient to place a separator or dust collector between the nozzle and the suction apparatus in order that the latter may not be clogged up by the collected dust, and my invention relates more particularly to a novel and efficient form of such dust collector which I have invented.

In most of the dust collectors known to me means are provided for retaining the dust and permitting the egress of the air which consists in interrupting or deflecting the current of dust laden air entering the apparatus, so that the dust will be deposited thereby within the apparatus as the current of air flows onward. Such a dust collector, however, is itself liable to be choked or clogged with the dust collected therein and so to impair the efficiency of the apparatus. It, further, has been proposed to interpose between the ingress and egress apertures of the apparatus a filtering bag or cloth for the purpose of holding back the dust and permitting the air to pass through. It has been recognized that these bags or cloths soon become clogged and thus prevent the passage of air through them and render the whole mechanism ineffective, unless it is subject frequently to a jarring action for the purpose of freeing it from adherent dust. In the previous proposals of this kind, the filtering cloth, (bag or diaphragm) has been so arranged and supported in the apparatus as to call for the provision of special means for subjecting it to the jarring action referred to. This special means among other disadvantages incident to its use, not only entails expense in the production of the apparatus, but when it is automatic in its character it calls for the expenditure of power to operate it, and if it be non-automatic in character it calls for more or less frequent attention from, and operation by, the attendant. In my dust collector I have overcome these disadvantages by providing means interposed between the air inlet and the air outlet consisting of a diaphragm adapted to retain the dust and permit the passage of air therethrough and which diaphragm is made of flexible material, such as canvas, and is so arranged as to freely respond to variations in the pressure within the same, being free to be automatically collapsed and distended thereby, whereby, when the suction apparatus ceases to operate, the flexible diaphragm collapses and by such action automatically discharges from its inlet surface the dust which has collected thereon. The same result occurs when, for any reasons, variations take place in the strength of the suction current, and the vibrations or shocks thus communicated to the flexible diaphragm are sufficient to keep its inlet surface constantly clear and to maintain its efficiency at a high point.

In the drawings, there is shown a central vertical section and pressure elevation of a preferred form of dust collector embodying my invention.

In the drawing, 10 is a casing preferably made in three parts, namely, a central upright cylinder 11, a cover 12 and a conical bottom 13, all secured together by bolts 14, 14, or in any other usual manner. The bottom is provided with means for tightly closing it, comprising a plate 15, an encircling strap 16, and a screw handle 17. This means of closure is of usual form and needs no special or other description. The casing is supported on legs 18, or other suitable forms of support, in order that it may be elevated above the ground.

An outlet pipe 20 having a terminal screw threaded fitting 21 adapted to engage with a threaded aperture formed in the lower part of the casing leads to the suction pump or other vacuum creating apparatus.

An air inlet pipe 30 provided with a branch pipe 31 externally threaded and adapted to engage with the threads in an aperture in the casing leads to the suction nozzle above referred to, which may be of any approved form and construction. The branch pipe terminates inwardly in a suitable fitting 32 provided with a centrally placed vertical pipe 33 terminating in a hood 34 and which hood is supported on the pipe 33 by means of upright pieces 35 leaving spaces 36 between them through which the air is adapted to discharge. The hood 34 is preferably made impervious to air on its upper side.

Located within the casing 10 is a dust collecting chamber comprising a lower portion provided with a cylindrical wall 41 impervious to air and which is preferably made integral with the conical bottom 13 of the casing and is so placed within the casing as to leave an annular space 50 between it and the walls of the casing. The upper portion of the dust collecting chamber is provided with walls 42 of flexible material, preferably canvas, and which are made integral with a diaphragm 43 of the same material stretching transversely across the casing above the hood 34. The lower edge of the canvas is secured to the upper edge of the cylinder 41 by means of a strap 44 of leather, metal or other suitable material.

It will be observed that the diaphragm 43 is sufficiently loose to enable it to be distended and collapsed and that it is free from internal supports which would retard or prevent it from freely responding to the variations of pressure in the apparatus. The flexible bag, formed by the wall 42 and diaphragm 43, being supported at its lower end or mouth only, and arranged to receive the inlet for the dust-laden air within it, provides a most efficient means for separating the dust from the air without requiring special means or attention to prevent it from becoming clogged with dust.

The method of using the device is as follows: The suction pump being started, a current of air is drawn through the air inlet pipe 30, the branch pipes 31 and 33, out through the spaces 36, through the diaphragm 43 into the annular space 50 and thence into the air outlet pipe 20. The cleansing nozzle being moved over the surface to be cleaned, the dust removed from said surface is carried along by the inflowing current of air until it strikes the flexible wall 42, or the diaphragm 43 of the dust collecting chamber 40, when its discharge is prevented by the body of the canvas of which this wall and diaphragm is composed, but the air is allowed to flow therethrough. The pressure of the air within the dust collecting chamber distends the flexible walls and if the partial vacuum is maintained at an efficient point, these flexible walls remain practically rigid under the influence of such pressure. If, however, the suction ceases, or becomes less, the pressure within the air collecting chamber is no longer sufficient to maintain these flexible walls in their rigid position, and the diaphragm 43 collapses and falls down upon the head 34, and in so doing the dust which is collected on its under surface is shaken therefrom and falls to the bottom of the casing whence it may be removed through the opening provided for that purpose when a sufficient amount has been collected.

What I claim as new is:—

1. A separator for dust removing apparatus, comprising a casing, an air inlet having a terminal hood an air outlet and a diaphragm loosely arranged over said hood and between the same and the outlet and adapted to be supported by the hood when collapsed, said diaphragm also adapted to retain the dust and permit the passage of air therethrough and free to be distended and collapsed by variations in the pressure within the same, for the purpose set forth.

2. A separator for dust removing apparatus, comprising a casing, an air inlet having a terminal hood, an air outlet and an air collecting chamber having a rigid lower portion impervious to air and an upper flexible portion adapted to retain the dust and permit the passage of the air therethrough, said upper portion arranged over the mouth of the air inlet and adapted to be upheld when collapsed by the hood and free to be distended and collapsed by variations in the pressure within the same.

3. A separator for dust removing apparatus, comprising an outer casing, having an air outlet, an inner casing arranged therein and communicating therewith at one end, and having its lower portion tapering downwardly and provided with a dust removing opening, an air inlet leading within said inner casing, and a filtering bag mounted in an inverted position over the communicating end of said inner casing, free to be distended and collapsed by variations in the pressure within said inner casing to free itself from dust and permit the same to drop within said casing, substantially as described.

4. A separator for dust removing apparatus, comprising an outer casing having an air outlet, an inner casing arranged therein, having a conical base projecting downwardly through said outer casing, and opening at its upper end within said outer casing, means secured to said inner casing, closing the lower end of said outer casing, said conical base of said inner casing having a dust discharge opening, and a filtering bag mounted in an inverted position over the upper end of said inner casing, free to be distended and collapsed by variations in the pressure within said inner casing to free itself from dust and permit the same to drop within said inner casing.

In testimony whereof I affix my signature in presence of two witnesses.

RALPH F. DISERENS.

Witnesses:
 GILES E. McCLEERY,
 CHAS. C. McCAFFERTY.